United States Patent Office 3,635,903
Patented Jan. 18, 1972

3,635,903
CURING SYSTEM FOR POLYMERIC
RUBBER MATERIALS
James E. Kearnan, Yorktown Heights, N.Y., assignor to
Stauffer Chemical Company, New York, N.Y.
No Drawing. Continuation-in-part of abandoned application Ser. No. 680,000, Nov. 2, 1967. This application
Oct. 15, 1969, Ser. No. 866,741
Int. Cl. C08f 27/06
U.S. Cl. 260—79.5 B          6 Claims

ABSTRACT OF THE DISCLOSURE

A vulcanized product obtained by heating a rubber-like alpha olefin copolymer in the presence of a curing agent comprising a blend of a tetraalkylthiuram sulfide and a N,N'-polythio-bis-dialkyl amine.

RELATED APPLICATION

This application is a continuation-in-part of application Ser. No. 680,000, filed Nov. 2, 1967, now abandoned.

BACKGROUND OF THE INVENTION

Copolymers derived from alpha olefins such, for example, as ethylene/propylene rubber, have recently entered the market on a large commercial scale. Because of their low monomer cost, these materials promise to be the rubber industry's lowest priced elastomers and, because of their essentially free double bond content, they are outstanding in their resistance to degradation by oxygen and ozone. For this same reason, however, they are rather difficult to vulcanize. Moreover, an objectionable noxious odor is given off when such copolymers are cured or vulcanized.

In order to overcome this vulcanization problem, a sulfur curable, synthetic rubber composition based on a copolymer of ethylene and propylene has now been developed. In addition to ethylene and propylene, these products contain moieties of a third monomer unit derived from an non-conjugated diene. The resulting terpolymers are found to contain a controlled degree of unsaturation which provides curing sites for vulcanization with standard sulfur containing curing agents. However, although the odor problem is less critical as a result of the use of these terpolymers, their curing rate is still far too slow for most purposes.

To reduce the curing time for these ethylene/propylene/diene terpolymers, the use of curing agents or cross-linking agents has been proposed in an effort to improve upon their vulcanization characteristics. Thus, commercial manufacturers of these ethylene/propylene/diene terpolymers recommend recipes containing curing agents such as tetramethylthiuram disulfide, 2-mercaptobenzothiazole, tellurium diethyldithiocarbamate and dipentamethylenethiuram tetrasulfide. However, the recipes heretofore formulated with the latter curing agents have not been notably successful in reducing the curing time of these terpolymers.

Thus, there has been a long felt need for curing agents for ethylene/propylene/diene terpolymers which will be able to affect their cross-linking at reduced temperature levels while, nonetheless, permitting the use of substantially shorter curing times.

BRIEF DESCRIPTION OF THE INVENTION

It has been discovered that both the cure and scorch time for ethylene/propylene/diene terpolymers can be substantially improved by employing a unique combination of curing agents comprising a blend of: (1) a tetraalkylthiuram sulfide wherein said alkyl group may contain from 1 to 4 carbon atoms such, for example, as tetramethylthiuram disulfide, tetraethylthiuram disulfide, tetramethylthiuram monosulfide, or tetrabutylthiuram monosulfide and (2) a N,N'-polythio-bis-dialkyl amine wherein the alkyl group of the latter amine can be methyl, ethyl, propyl, butyl and mixtures thereof. Thus, when the latter blend of curing agents is combined with a polymeric material, it produces a cumulative effect that is superior to the sum of the effects that is achieved when each of the components of the blend are used individually. This result is unexpected since the use of these two classes of curing agents on an individual basis does not produce a rapid cure in the conventional or commercially curable rubbers. Mixtures of these two types of curing agents may be used in combination with other known cross-linking agents if so desired by the practitioner.

DETAILED DESCRIPTION OF THE INVENTION

In the practice of the present invention, an ethylene/propylene/diene terpolymer is selected for a particular end use. Thus, the vulcanizates applicable for this process are sulfur curable unsaturated elastomers of the type generally used in the rubber industry and which cure at a standard temperature above about 120° C. Thus, the polymers employed in the process of the present invention may be defined as ethylene/propylene/diene terpolymers wherein the non-conjugated diene comonomer may be selected, for example, from the group consisting of 1,4-hexadiene; dicyclopentadiene; methylene norbornene; ethylidene norbornene; 1,5-cyclooctadiene; and, heptacyclohexadecadiene. If desired, two or more of the latter diene comonomers may be utilized in preparing these polymers. Such terpolymers are well known in the art, see, for example, U.S. Pat. No. 3,153,023 and 3,226,356 or British Pat. No. 1,044,718.

The concentration of the moieties derived from the respective comonomers within the above defined terpolymers may range from about 25 to 75%, by weight, for ethylene; from about 20 to 70%, by weight, for propylene; and, from about 1 to 15%, by weight, for the selected diene comonomer; the latter proportions being based upon the total weight of the terpolymer.

The curing agent blend of the present invention may be compounded with the selected polymeric material in a conventional manner. The curing agent employed with the present invention is a combination of: (1) a tetraalkylthiuram sulfide, preferably tetramethylthiuram disulfide, and (2) a N,N'-polythio-bis-dialkylamine wherein the alkyl component may be methyl, ethyl, propyl, butyl and mixtures thereof. As was pointed out previously, the tetraalkylthiuram disulfides are commercially available curing agents. The selected N,N'-polythio-bis-dialkylamine should contain at least about five sulfur atoms within its molecule, with six or seven sulfur atoms being preferable. The latter compounds may be synthesized in a conventional manner by reacting a dialkylamine with sulfure chloride. Specific examples of these N,N'-polythio-bis-dialkylamines would be N,N'-pentathio-bis-dimethyl amine;
N,N'-pentathio-bis-diethyl amine;
N,N'-pentathio-bis-dipropyl amine;
N,N'-pentathio-bis-dibutyl amine;
N,N'-hexathio-bis-dimethyl amine;
N,N'-hexathio-bis-diethyl amine;
N,N'-hexathio-bis-dipropyl amine;
N,N'-hexathio-bis-dibutyl amine;
N,N'-heptathio-bis-dimethyl amine;
N,N'-heptathio-bis-diethyl amine;
N,N'-heptathio-bis-dipropyl amine; and,
N,N'-heptathio-bis-dibutyl amine.

The concentration of curing agent that may be compounded with the polymeric material may range between about 0.2 to 3.0 parts for the tetraalkyl thiuram sulfide while the N,N'-polythio-bis-dialkyl amine may range between about 0.25 and 5.0 parts by weight. As is well understood in this art, the above amounts are based on parts by weight per 100 parts of the polymeric composition.

If desired, one or more conventional accelerating agents such, for example, as 2-mercaptobenzothiazole, tellurium diethyl dithiocarbamate, or dipentamethylenethiuram tetrasulfide may be compounded into the polymeric material along with the novel blend comprising the curing agent of this invention.

After the curing agent has been fully and intimately admixed therewith, the selected polymeric material may be cured in a conventional manner as is well understood in the art. For example, temperatures in the range of from about 250 to 420° F. may be applied for periods of from about 0.75 to 150 minutes. Needless to say, the use of higher temperatures will, of course, reduce the time required to complete the cure. A typical curing cycle would be 320° F. for about 8–30 minutes. Significantly, the cure time for the thus treated polymeric substrate has been demonstrated to be substantially reduced due to the presence of the above described combination of reagents. Moreover, substantial improvements also result in scorch time characteristics; scorch time being defined as the time required to initiate cross-linking at a given temperature. Thus, with the present invention, scorch time is clearly improved since, at processing temperatures, premature cross-linking is substantially eliminated while at cure temperatures excellent mold flow is provided.

A better understanding of the invention can be gained from the following examples in which all parts given are on weight unless otherwise noted. The specific materials and conditions used are typical, although they should not be construed to limit the invention. In these examples, the monomer ratios for the various ethylene/propylene/diene terpolymers are expressed in terms of percent, by weight.

Example 1

This example describes the use of N,N'-hexathio-bis-dimethyl amine in combination with varying amounts of tetramethylthiuram disulfide as a curing agent blend for an ethylene/propylene/diene terpolymer rubber composition. Thus, a master batch was prepared by admixing 100 parts of an ethylene/propylene/methylene norbornene (55:42:3) terpolymer with 150 parts carbon black, 70 parts naphthenic process oil, 1 part stearic acid and 5.0 parts zinc oxide. Portions of this master batch were then used to prepare the following stocks to which various curatives, as shown, were added; the mixing being done in a conventional manner.

| Stock | A | B | C | D | E |
|---|---|---|---|---|---|
| Master batch | 326 | 326 | 326 | 3.6 | 326 |
| Mercaptobenzothiazole | 0.5 | 0.5 | 095 | 0.5 | 0.5 |
| Sulfur | 1.0 | 1.0 | 1.0 | 1.0 | 1.0 |
| N,N'-hexathio-bis-dimethylamine | 0.5 | 0.5 | 0.5 | 0.5 | 0.5 |
| Tetramethylthiuram disulfide | 0.5 | 0.1 | 1.5 | 2.0 | 3.0 |

These stocks were cured at 320° F. in a rheometer operating at 900 cycles per minute. The scorch time was tested on a Mooney Viscometer operating at 270° F. The results obtained are summarized in Table I below:

TABLE I

| Stock | Mooney viscometer scorch time, min. | Rheometer cure time, min., 90% maximum |
|---|---|---|
| A | 8.8 | 36.0 |
| B | 8.8 | 25.0 |
| C | 10.2 | 20.3 |
| D | 11.6 | 16.3 |
| E | 14.2 | 14.4 |

Example 2

The procedure, as described in Example 1, was repeated using additional known curing agents. The following stocks were prepared, the mixing being done in a conventional manner.

| Stock | A | B | C | D | E | F |
|---|---|---|---|---|---|---|
| Master batch (as described in Example 1) | 326 | 326 | 326 | 326 | 326 | 326 |
| Mercaptobenzothiazole | 1.5 | 1.5 | 1.5 | 1.5 | 1.5 | 0.5 |
| Sulfur | 2.0 | 1.5 | 1.0 | 1.0 | 1.0 | 1.1 |
| Tellurium diethyldithiocarbamate | 0.8 | 0.8 | 0.8 | | 0.8 | |
| Dipentamethylenethiuram tetrasulfide | 0.8 | 0.8 | 0.8 | 0.8 | | |
| Tetramethylthiuram disulfide | 0.8 | | 0.8 | 0.8 | 0.8 | 1.5 |
| N,N'-hexathio-bis-dimethylamine | | 1.0 | 1.0 | 1.0 | 1.0 | 0.5 |

These stocks were cured at 320° F. in a rheometer operating at 900 c.p.m. The scorch time was tested on a Mooney Viscometer operating at 270° F. The results obtained are summarized in Table 2 below:

TABLE 2

| Stock | Mooney viscometer scorch time, min. | Rheometer cure time, min., 90% maximum |
|---|---|---|
| A | 6.4 | 42.0 |
| B | 5.7 | 49.0 |
| C | 5.9 | 27.1 |
| D | 7.0 | 27.8 |
| E | 5.9 | 24.0 |
| F | 10.6 | 26.3 |

As can be seen from the above data in Table 2, Stocks A and B displayed a substantially longer cure time than did Stocks C thru F. This clearly demonstrates the synergism achieved when tetramethylthiuran disulfide was combined with N,N'-hexathiobis-dialkyl amine according to the process of this invention.

Example 3

This example describes the use of N,N'-polythiol-bis-dimethyl amine, with varying sulfur rank, in combination with tetramethyl thiuramdisulfide as curing agent for an ethylene/propylene/methylene norbrnene (55:42:3) terpolymer rubber composition. Thus, a master batch was prepared by mixing in 100 parts of the ethylene/propylene/diene terpolymer composition, 150 parts carbon black, 70 parts naphthenic process oil, 1 part stearic acid, 5 parts zinc oxide, 0.5 parts mercaptobenzothiazole, 1.5 parts tetramethyl thiuram disulfide and varying amounts of N,N'-polythiol-bis-dimethyl amine. Portions of this material were then used to prepare the following stocks, the mixing being done in a conventional manner.

| Stock | A | B | C | D | E |
|---|---|---|---|---|---|
| Master batch | 326 | 326 | 326 | 326 | 326 |
| Mercaptobenzothiazole | 0.5 | 0.5 | 0.5 | 0.5 | 0.5 |
| Tetramethylthiuram disulfide | 1.5 | 1.5 | 1.5 | 1.5 | 1.5 |
| N,N'-dithio-bis-dimethyl amine | 3.5 | | | | |
| N,N'-trithio-bis-dimethyl amine | | 2.9 | | | |
| N,N'-tetrathio-bis-dimethyl amine | | | 2.4 | | |
| N,N'-pentathio-bis-dimethyl amine | | | | 2.4 | |

These stocks were cured at 320° F. in rheometer operating at 900 c.p.m. The scorch time was tested on a Mooney Viscometer operating at 270° F. The results obtained are summarized in Table 3 below:

TABLE 3

| Stock | Mooney scorch time, min. | Rheometer cure time, min., 90% max. |
|---|---|---|
| A | 26.2 | 11.3 |
| B | 20.4 | 13.0 |
| C | 13.0 | 16.5 |
| D | 12.8 | 18.2 |
| E | 11.4 | 33.7 |

Variations may be made in proportions, procedures and materials without departing from the scope of this invention as defined in the following claims.

What is claimed is:

1. A process for vulcanizing a rubber-like ethylene/propylene/non-conjugated diene terpolymer, said process comprising the step of heating said copolymer in the presence of a curing agent consisting essentially of a blend of: (1) a tetraalkylthiuram sulfide and (2) an N,N'-polythio-bis-dialkyl amine containing at least about five sulfur atoms.

2. The process of claim 1, wherein said curing agent comprises from about 0.2 to 3.0 parts of said tetraalkylthiuram sulfide and from about 0.25 to 5.0 parts of said N,N'-polythio-bis-dialkyl amine; the latter limits being by weight per 100 parts of said rubber-like polymer.

3. The process of claim 1, wherein the alkyl group of said N,N'-polythio-bis-dialkyl amine is selected from the group consisting of methyl, ethyl, propyl and butyl.

4. The process of claim 1, wherein said N,N'-polythio-bis-dialkyl amine is selected from the group consisting of N,N'-pentathio-bis-dialkyl amines, N,N'-hexathio-bis-dialkyl amines, and N,N'-heptathio-bis-dialkyl amines.

5. The process of claim 2, wherein the alkyl group of said N,N-polythio-bis-dialkyl amine is selected from the group consisting of methyl, ethyl, propyl and butyl.

6. The process of claim 1, wherein said tetraalkylthiuram sulfide is selected from the group consisting of tetramethylthiuram disulfide, tetraethylthiuram disulfide, tetramethylthiuram monosulfide and tetrabutylthiuram monosulfide.

References Cited

UNITED STATES PATENTS

| | | | |
|---|---|---|---|
| 2,490,518 | 12/1949 | Hand | 260—79.5 |
| 2,747,005 | 5/1956 | Zerbe | 260—763 |
| 3,012,014 | 12/1961 | Woods | 260—79 |
| 3,063,973 | 11/1962 | Gladding | 260—79.5 |
| 3,362,937 | 1/1968 | Kent | 260—79.5 |
| 3,379,701 | 4/1968 | Gladding | 260—80.7 |

FOREIGN PATENTS

| | | | |
|---|---|---|---|
| 604,583 | 9/1960 | Canada | 260—583 |

JOSEPH L. SCHOFER, Primary Examiner

C. A. HENDERSON, Jr., Assistant Examiner

U.S. Cl. X.R.

260—793, 795, 798